United States Patent
Lewis et al.

(10) Patent No.: US 8,721,257 B2
(45) Date of Patent: May 13, 2014

(54) ROTOR BLADE TIP CLEARANCE CONTROL

(75) Inventors: Leo V. Lewis, Kenilworth (GB); Marko Bacic, Abthorpe (GB)

(73) Assignee: Rolls-Royce PLC, London (GB)

( * ) Notice: Subject to any disclaimer, the term of this patent is extended or adjusted under 35 U.S.C. 154(b) by 407 days.

(21) Appl. No.: 13/050,367

(22) Filed: Mar. 17, 2011

(65) Prior Publication Data

US 2011/0229306 A1   Sep. 22, 2011

(30) Foreign Application Priority Data

Mar. 17, 2010   (GB) .................................. 1004381.8

(51) Int. Cl.
F04D 29/58   (2006.01)

(52) U.S. Cl.
USPC ............................................................. 415/1

(58) Field of Classification Search
USPC ................. 415/173.1, 115, 175, 173.4, 173.2; 416/95, 97 R
See application file for complete search history.

(56) References Cited

U.S. PATENT DOCUMENTS

| | | | |
|---|---|---|---|
| 4,683,716 A * | 8/1987 | Wright et al. ............. | 60/226.1 |
| 4,844,688 A * | 7/1989 | Clough et al. ............ | 415/116 |
| 5,116,199 A * | 5/1992 | Ciokajlo .................... | 415/173.2 |
| 6,079,943 A * | 6/2000 | Sexton et al. ............. | 415/115 |
| 2005/0042080 A1 | 2/2005 | Gendraud et al. | |
| 2005/0249584 A1 | 11/2005 | Amiot et al. | |

FOREIGN PATENT DOCUMENTS

| EP | 1 798 381 A2 | 6/2007 |
|---|---|---|
| EP | 1 930 549 A2 | 6/2008 |

OTHER PUBLICATIONS

Search Report issued in British Application No. GB1004381.8 dated May 26, 2010.

* cited by examiner

Primary Examiner — Nathaniel Wiehe
Assistant Examiner — Eldon Brockman
(74) Attorney, Agent, or Firm — Oliff PLC (57) ABSTRACT

A gas turbine engine has a row of circumferentially spaced rotor blades and a plurality of seal segments circumscribing the rotor blade tips and attached to a radially inward side of a casing of the engine. The seal segments are spaced from the casing by a spacing cavity. A flow of relatively hot cooling air is routed to the spacing cavity to cool the seal segments. The engine has an external cooling arrangement for impinging relatively cold cooling air on a radially outward side of the casing. The engine has a wall containing a plurality of through-holes which is attached to a radially inward side of the casing adjacent the seal segments. The wall is spaced from the casing to define a heating control chamber between the wall and the casing. The engine has one or more closable ducts which allow air to be exhausted from the heating control chamber.

17 Claims, 8 Drawing Sheets

ROTOR BLADE TIP CLEARANCE CONTROL

The present invention relates to clearance control of gas turbine engine rotor blade tips.

Figure 1:
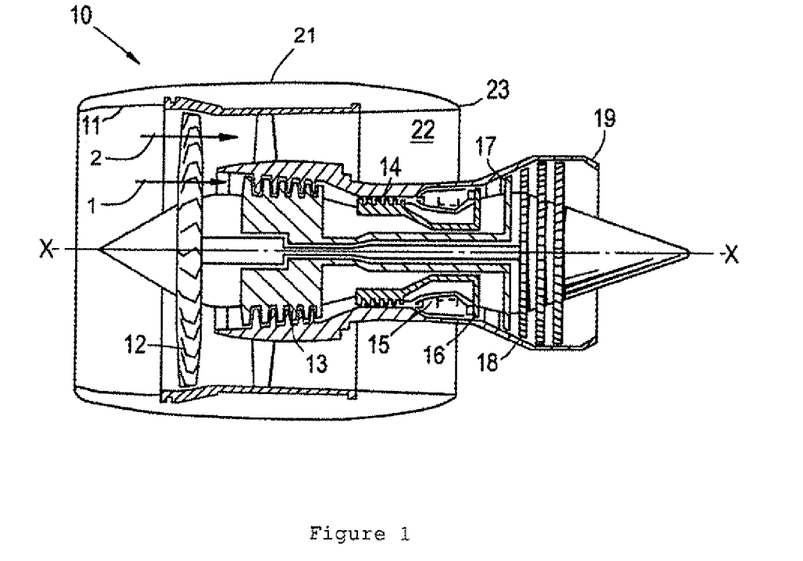
FIG. 1 shows schematically a longitudinal cross-section through a ducted fan gas turbine engine.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow 1 into the intermediate pressure compressor 14 and a second air flow 2 which passes through the bypass duct 22 to provide propulsive thrust. The intermediate pressure compressor 13 compresses the air flow 1 directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

It is common practice on large civil aeroengines to achieve tip clearance control on a turbine stage by controlling the temperature of the main casing directly outboard of, or in the vicinity of, the static shroud segments which form the gas path seal with the tips of the rotor blades.

The casing temperature is controlled by blowing relatively cool, low pressure air on to the outer surface of the casing, thereby reducing its temperature and, because it is a circumferentially continuous component, producing a radial contraction of the casing. As the assemblies for mounting the shroud segments to the casing have little radial stiffness to oppose the casing contraction, the gas-washed surfaces of the segments are pushed towards the rotor blade tips, which reduces the running tip clearance.

The source of the cooling air varies between different makes of engine, but it is usually ducted through a manifold and then directed normally onto the casing to provide impingement cooling. There may also be some convective cooling from transverse flow i.e. parallel to the casing outer surface. The cooling of the casing can vary from a few tens of ° C. to a few hundred ° C., and can thereby produce a radial contraction in the range from zero to 2 mm.

The level of external Turbine Case Cooling (TCC) flow may be varied at different flight phases by valve(s) upstream of the manifold. The valve can be, for example, a 2-position valve giving an off/on or low flow/high flow level of flow control. Alternatively, it can be a modulated valve, capable of giving any flow from zero up to a valve fully-open flow level.

The amount of external TCC cooling flow required on tip clearance grounds is, in general, a function of a) the level of contraction required and b) the heat transfer condition pertaining on the inside (hot side) of the casing.

Figure 2:
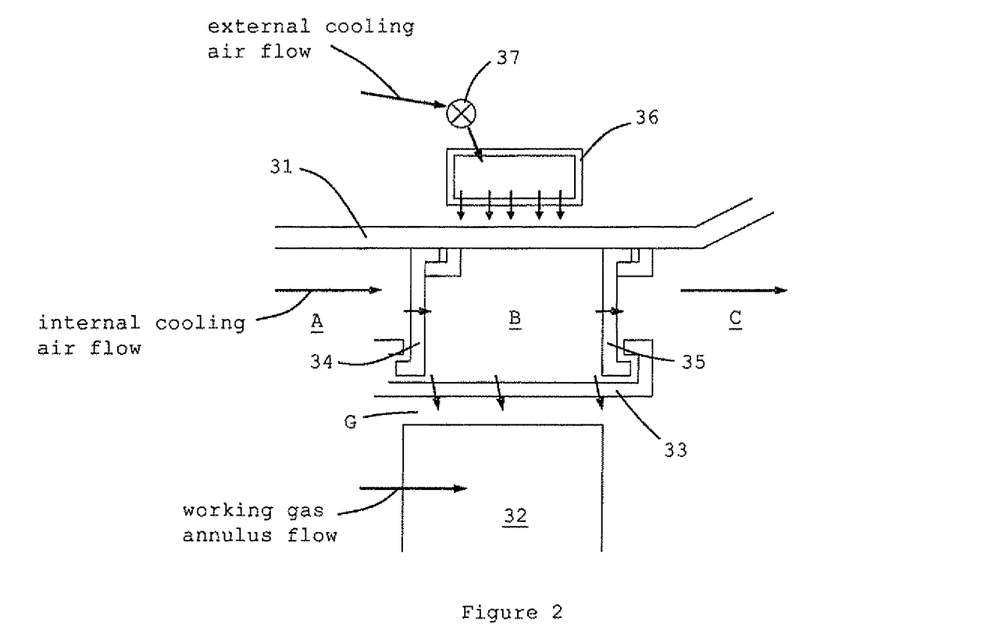
FIG. 2 is a schematic longitudinal cross-section through an engine at a turbine rotor stage and shows a TCC arrangement.
Figure 3:
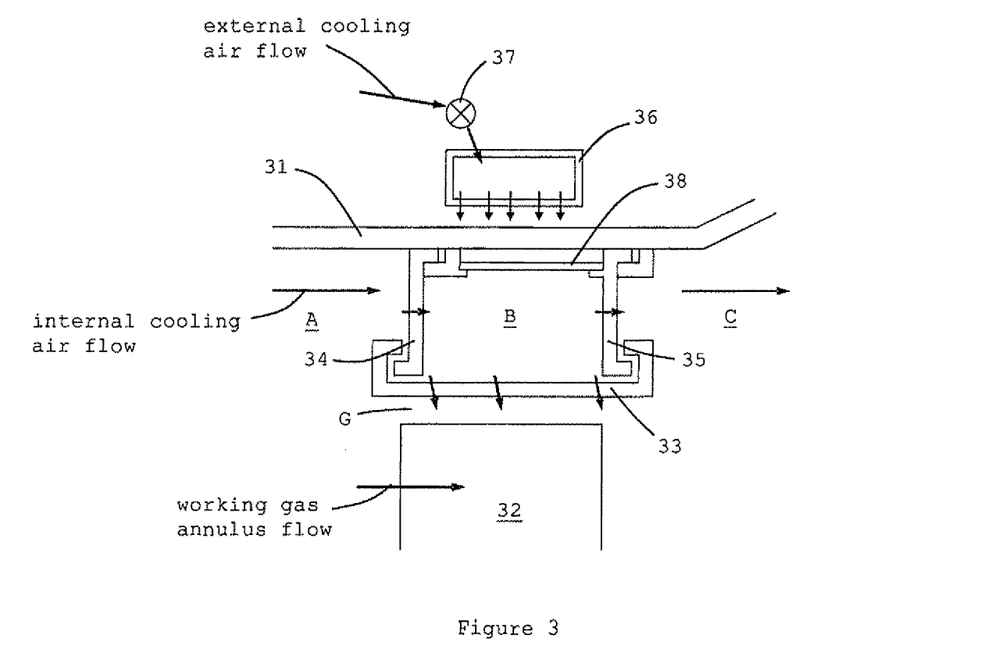
FIG. 3 is a schematic longitudinal cross-section through an engine at a turbine rotor stage and shows an alternative TCC arrangement.

FIGS. 2 and 3 are schematic longitudinal cross-sections through engines showing respective TCC arrangements, each with a different configuration determining the hot side heat transfer condition on the engine casing. In both figures, corresponding features have the same reference numbers. The engine of FIG. 2 has a main engine casing 31 with a row of turbine stage rotor blades 32 radially inwards of the casing. Static shroud seal segments 33 define the gas path seal with the tips of the blades, the segments being radially spaced from the tips by a clearance gap G. The seal segments are mounted to the inner side of the casing by front 34 and rear 35 segment carriers. A hollow ring manifold 36 surrounds the casing radially outwards of the seal segments. The ring manifold receives a supply of case cooling air, the supply being varied by a modulated or two-stop valve 37. The cooling air leaves the ring manifold through a plurality of through-holes formed in the inner wall of the manifold to impinge as jets on the casing outer surface and thereby provide TCC.

The heat transfer conditions at the radially inner side of the casing 31 are determined to a large extent by a flow of relatively hot, high pressure, internal cooling air which flows left to right through cavities A, B and C either through or around, the segment carriers 34, 35. From cavity B, which spaces the seal segments 33 from the inner side of the casing 31, some of the air exhausts inboard to cool and seal the seal segments 33 from the ingestion of annulus gas. From cavity C, the air feeds the downstream internal cooling system.

The arrangement in FIG. 2 runs a risk of causing high levels of heat transfer from the relatively hot internal cooling air to the main casing 31, directly inboard of the TCC cooling jets. This can produce higher than necessary levels of the external cooling flow to achieve the desired optimum contractions.

Therefore, the arrangement of FIG. 3 is sometimes provided, in which the inside surface of the main casing 31 a heat shield 38 is positioned to reduce the rate of heat transfer from the hot side air flow to the casing.

When a modulated valve 37 is employed, it is possible with both arrangements to achieve rotor tip clearances G close to the optimum for most high power phases of a flight cycle. However, it is often not possible to run the important cruise clearance at the optimum, because of the "step climb effect".

If, at the end of a cruise phase, the aircraft needs to climb to the next altitude, the engine is accelerated from cruise thrust to step climb thrust. The duration of the acceleration is typically around 5 seconds, and within this time the rotor blade tips close on to the seal segments 33 due to increases in centrifugal growth of the disc and blades 32, plus increases in the thermal growth of the blades. The rotor growth increment in the 5 seconds may be around 0.15 mm to 0.20 mm for the core turbines in a large civil engine.

The arrangements of FIGS. 2 and 3 generally fail to generate significant casing radial growth during this 35 second period, even if the TCC valve 37 is switched to closed as soon as the acceleration starts. Therefore, the cruise clearance G has to run 0.15 to 0.20 mm more open than optimum, because of the step climb acceleration closure. Even if the cruise clearance is initially set as tight as possible, the first step climb acceleration causes blade tip rub and resets the subsequent cruise clearance.

Thus, cruise running clearances are penalised by the amount of the step climb acceleration closure. This can produce a significant cruise specific fuel consumption (sfc) penalty.

Accordingly, an aim of the present invention is to provide an engine which can have a reduced cruise clearance gap.

Thus, a first aspect of the present invention provides a gas turbine engine having:

a row of circumferentially spaced rotor blades, each having a radially outer tip, a plurality of seal segments circumscribing the rotor blade tips and attached to a radially inward side of a casing of the engine, the seal segments being spaced from the casing by a spacing cavity, whereby, in use, a flow of relatively hot cooling air is routed to the spacing cavity to provide cooling for the seal segments, and an external cooling arrangement for impinging relatively cold cooling air on a radially outward side of the casing and thereby controlling a radial clearance between the rotor blade tips and the seal segments;

wherein the engine further has a wall containing a plurality of through-holes which is attached to a radially inward side of the casing adjacent the seal segments, the wall being spaced from the casing to define a heating control chamber between the wall and the casing, and the engine further has one or more closable ducts which allow air to be exhausted from the heating control chamber, whereby, when the ducts are open, a portion of the hot cooling air flows through the through-holes to impinge on the casing and then exhausts from the heating control chamber through the ducts.

The closable ducts allow the heat transfer condition on the internal surface of the casing to be varied. With the ducts open and hot cooling air impinging on the casing, internal heat transfer to the casing is increased, expanding the casing. In contrast, with the ducts closed, routes for the hot cooling gas to exhaust from the heating control chamber are limited, which prevents or reduces circulation of hot cooling air in the heating control chamber, and thus internal heat transfer to the casing is reduced. The reduction in internal hear transfer contracts the casing, or, alternatively, the amount of external cooling needed to produce a given casing contraction can be reduced.

Advantageously, the variation in heat transfer condition can be implemented relatively rapidly, allowing the casing temperature to vary in the timescales associated with step climb acceleration. In this way, the cruise clearance gap can be reduced, as the casing can be rapidly expanded at step climb accelerations by opening the ducts.

The gas turbine engine may have any one or, to the extent that they are compatible, any combination of the following optional features.

Conveniently, according to one option, the wall may be a dividing wall which separates the spacing cavity into two radially spaced chambers, the radially inner chamber receiving the flow of hot cooling air, and the radially outer chamber being the heating control chamber. When the ducts are open, the portion of hot cooling air flows from radially inner sub-chamber, through the dividing wall, and into the radially outer sub-chamber.

According to another option, however, the wall and the heating control chamber may be located forward of the spacing cavity. In this way, when the ducts are open, the portion of the hot cooling air can be diverted into the heating control chamber before it can enter the spacing cavity. If there is a higher pressure in the hot cooling air forward of the spacing cavity, this option can make use of that higher pressure to help drive the flow into the heating control chamber.

It is possible to combine both the above options. For example, a gas turbine according to the first option can further have a second wall containing a plurality of through-holes which is attached to a radially inward side of the casing adjacent the seal segments, the second wall being spaced from the casing to define a second heating control chamber between the wall and the casing, the second wall and the second heating control chamber being located forward of the spacing cavity. The engine then further having one or more second closable ducts which allow air to be exhausted from the second heating control chamber, whereby, when the second ducts are open, a portion of the hot cooling air flows through the through-holes of the second wall to impinge on the casing and then exhausts from the second heating control chamber through the second ducts.

The ducts may exhaust the hot cooling air to the radially inward side of the casing. For example, the hot cooling air can be exhausted to a position downstream of the spacing cavity. However, when the wall and the heating control chamber are located forward of the spacing cavity, conveniently the ducts can exhaust the hot cooling air into the spacing cavity. Advantageously, if the ducts accidently remain open, the flow of hot cooling air to the spacing cavity can then be maintained.

Alternatively, the ducts may exhaust the hot cooling air to the radially outward side of the casing, e.g. into a ventilation zone immediately outboard of the casing or into a fan bypass duct of the engine.

Preferably, the through-holes are substantially evenly distributed across the, or each, wall. This helps to produce uniform heating of the casing by the impinging hot cooling air.

Preferably, the, or each, wall is spaced from the casing by a distance which allows the hot cooling air to impinge on the casing as respective jets from the through-holes. The velocity of the air in the jets, as well as the temperature of the air, can thus increase heat transfer to the casing.

The engine may have only one duct exhausting the, or each, heating control chamber. Alternatively, the engine may have a plurality of ducts, e.g. circumferentially spaced around the casing, exhausting the, or each, heating control chamber.

Typically, the ducts are openable and closable under the action of one or more valves.

The external cooling arrangement may be configured such that the amount of impinging cold cooling air can be controllably varied, e.g. by a control valve.

The external cooling arrangement may comprise a manifold circumscribing the casing, the manifold carrying the cold cooling air and having a plurality of further through-holes at a radially inner side thereof through which the cold cooling air flows to impinge on the casing.

One option, when the ducts exhaust the hot cooling air to the radially outward side of the casing, is to exhaust the hot cooling air into the manifold of the external cooling arrangement. The exhausted hot cooling air can thus be recycled to impinge from the manifold onto the exterior of the casing. Particularly if the flow of cold cooling air is simultaneously decreased or stopped, this recycling can further increase heat transfer to the casing.

The gas turbine engine may further have a computer-based control system for controlling the flow of hot cooling air through the ducts, the cooling system being arranged such that the ducts open when the engine accelerates from a cruise operating condition. The computer-based control system may further control the impingement of cold cooling air on the casing from the external cooling arrangement, the cooling system being further arranged such that, when the ducts are open, the impingement of cold cooling air on the casing from the cooling arrangement is reduced or prevented.

Indeed, a further aspect of the present invention provides the computer-based control system of the first aspect.

Another aspect of the present invention provides a method of operating the gas turbine engine of the first aspect, the method comprising the steps of:

(a) running the engine at a cruise operating condition with the ducts closed, and (b) accelerating the engine and opening the ducts so that hot cooling air flows through the through-holes to impinge on the casing.

During step (a), cold cooling air from the external cooling arrangement may impinge on the radially outward side of the casing. However, during step (b), the impingement of cold cooling air from the external cooling arrangement on the radially outward side of the casing can be reduced or prevented.

The method may further comprise the steps, after step (b), of: (c) closing the ducts, and (d) running the engine at a second cruise operating condition. After step (b), impingement of cold cooling air from the external cooling arrangement on the radially outward side of the casing can be increased or recommenced.

Embodiments of the invention will now be described by way of example with reference to the accompanying drawings in which.

Figure 4:
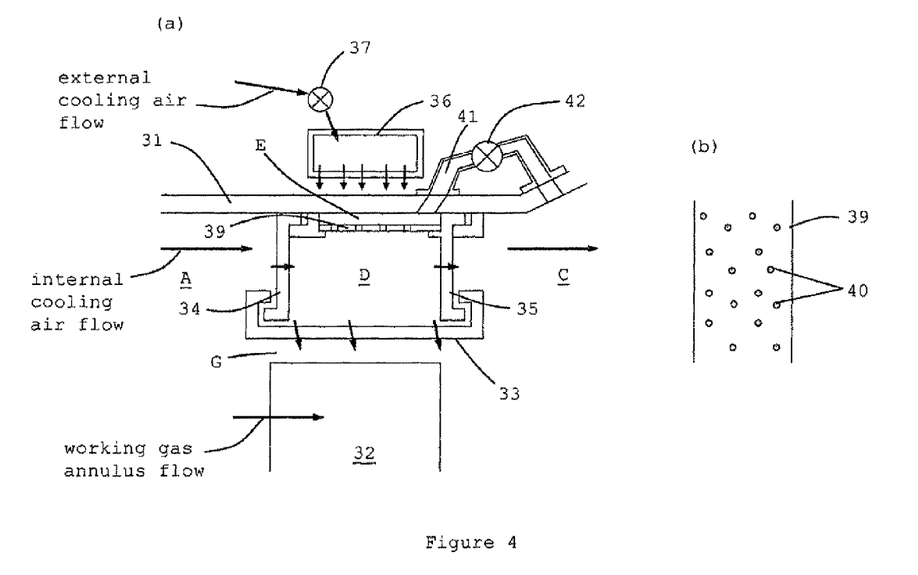
FIG. 4(a) is a schematic longitudinal cross-section through an engine at a turbine rotor stage and shows a TCC arrangement according to a first embodiment of the present invention in an operating mode when internal heat transfer is suppressed.
FIG. 4(b) is a schematic view of a dividing wall separating radially inner and outer chambers of the first embodiment.

FIG. 4(a) is a schematic longitudinal cross-section through an engine at a turbine rotor stage and shows a TCC arrangement according to a first embodiment of the present invention in an operating mode when internal heat transfer is suppressed. In FIG. 4(a), features corresponding to features of FIGS. 2 and 3 have the same reference numbers as in FIGS. 2 and 3. Thus the engine of FIG. 4(a) has a main engine casing 31 with a row of turbine stage rotor blades 32 radially inwards of the casing. Static shroud seal segments 33 define the gas path seal with the tips of the blades, the segments being radially spaced from the tips by a clearance gap G. The seal segments are mounted to the inner side of the casing by front 34 and rear 35 segment carriers. A hollow ring manifold 36 surrounds the casing radially outwards of the seal segments. The ring manifold receives a supply of case cooling air, the supply being varied by a modulated or two-stop valve 37. The cooling air leaves the ring manifold through a plurality of through-holes formed in the inner wall of the manifold to impinge as jets on the casing outer surface and thereby provide TCC.

A dividing wall 39 extends front to back between the front 34 and rear 35 segment carriers to divide the space (corresponding to cavity B in FIGS. 2 and 3) between the carriers into a radially inner chamber D bounded by the seal segments 33 and the dividing wall and a radially outer, heating control chamber E bounded by the dividing wall and the inner surface of the casing 31. The dividing wall contains an array of through-holes 40, as shown in FIG. 4(b), which is a schematic view of the wall from inner chamber D. The array can be random or regular, but preferably results in a uniform distribution of through-holes across the wall.

A duct 41 traversing the casing 31 allows the heating control chamber E to fluidly communicate with the interior of the casing downstream of the segment carriers 34, 35 at cavity C. A 2-position off/on or modulating valve 42 opens and closes the duct.

A flow of relatively hot, high pressure, internal cooling air flows left to right through cavity A, inner chamber D, and cavity C either through or around, the segment carriers 34, 35. From the inner chamber, some of the air exhausts inboard to cool and seal the seal segments 33 from the ingestion of annulus gas. From cavity C, the air feeds the downstream internal cooling system. As shown in FIG. 4(a), when valve 42 is off, there is no exhaust route from the heating control chamber E, and consequently little circulation of hot cooling air from the inner chamber to the heating control chamber via the through-holes 40. Internal heat transfer from the hot cooling air to the casing is thus suppressed. This allows a given casing contraction to be achieved with a relatively low TCC flow from the ring manifold 36.

Figure 5:
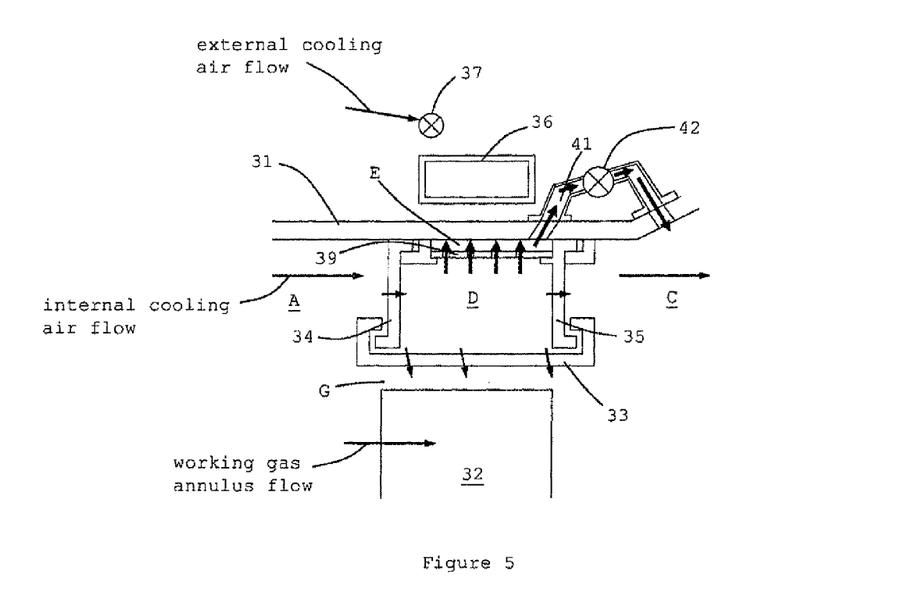
FIG. 5 shows the cross-section and the TCC arrangement of FIG. 4(a) in an operating mode when internal heat transfer is enhanced.

In contrast, FIG. 5 shows an operating mode of the TOG arrangement of the first embodiment when internal heat transfer is enhanced. With valve 42 on, hot cooling air flows through the through holes 40 of the dividing wall 39. The relatively small stand-off of the dividing wall from the casing 31 causes the in-flowing air to impinge as jets on the inner surface of the casing 31. The in-flowing air then exhausts from the heating control chamber E via duct 41 and is returned to the interior of the casing. Simultaneously with the opening of the duct, valve 37 can be switched off to prevent the impingement of cold cooling air from the ring manifold 36 onto the outer surface of the casing.

Closing the duct 41 and suppressing internal heat transfer from the hot cooling air to the casing 31 is the normal operating mode during a cruise phase of the engine, with TCC flow from the ring manifold 36 contracting the casing to reduce the clearance gap G. Indeed, with the suppressed internal heat transfer, even a relatively low TCC flow can reduce the casing temperature by an amount which allows the associated casing contraction to produce a minimal clearance gap. Opening the duct then enhances heat transfer from the hot cooling air to the casing due to both the high temperature and the high velocity of the impinging jets from the through-holes 40. The casing rapidly expands, and the expansion can be further enhanced by synchronising the opening of the duct with stopping or reducing the TCC flow from the ring manifold. This operating mode is used when a step climb acceleration mode commences. Such acceleration modes typically last for about 5 seconds, and the enhanced internal heat transfer may persist for the duration of the acceleration and, if necessary, for a short period thereafter. The duct is then closed and, typically, a step climbing operating mode is then entered which persists until a target altitude is reached, at which point the cruise phase operating mode can resume.

Typically a computer-based controller (not shown) controls the positions of the valves 37 and 41 and synchronises their operation with the engine operating condition.

Advantageously, by adopting a system of the present invention, which allows the internal heat transfer conditions to be varied, the casing can be rapidly expanded during step climb accelerations, and consequently cruise running clearances can be tightened up significantly, with significant sfc benefits achievable. As the casing heating during the step climb acceleration is generated by high temperature, high pressure air which is already available at the right location, there is very little delay in the temperature response of the supply air itself.

Relative to engines having TCC arrangements of the type shown in e.g. FIGS. 2 and 3, the hardware and air system changes needed to implement the variable internal heat transfer system are relatively small. For example, for the majority of a flight, and for all steady-state operations, the operation of the air system can in fact be unchanged, with little or no changes being required to the design of the external TCC components and air flows. Further, only one extra valve (i.e. valve 42) may have to be controlled, and this can be a 2-position valve which simplifies control aspects in the hot ventilation zone around the segment carriers 34, 35. Also, the dividing wall can be formed as a machining modification to an already-existing heat shield of the type shown as heat shield 38 in FIG. 3.

Figure 6:
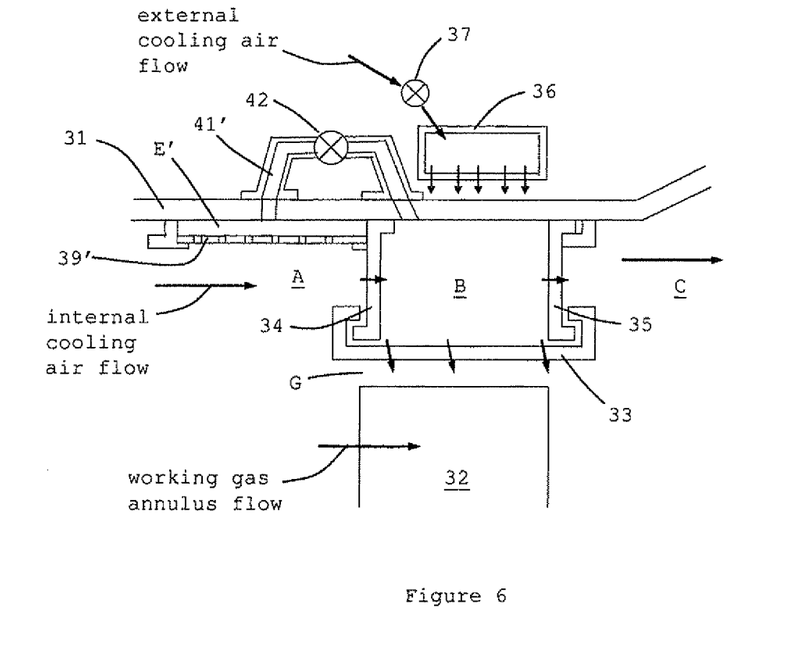
FIG. 6 is a schematic longitudinal cross-section through an engine at a turbine rotor stage and shows a TCC arrangement according to a second embodiment of the present invention in an operating mode when internal heat transfer is suppressed.
Figure 7:
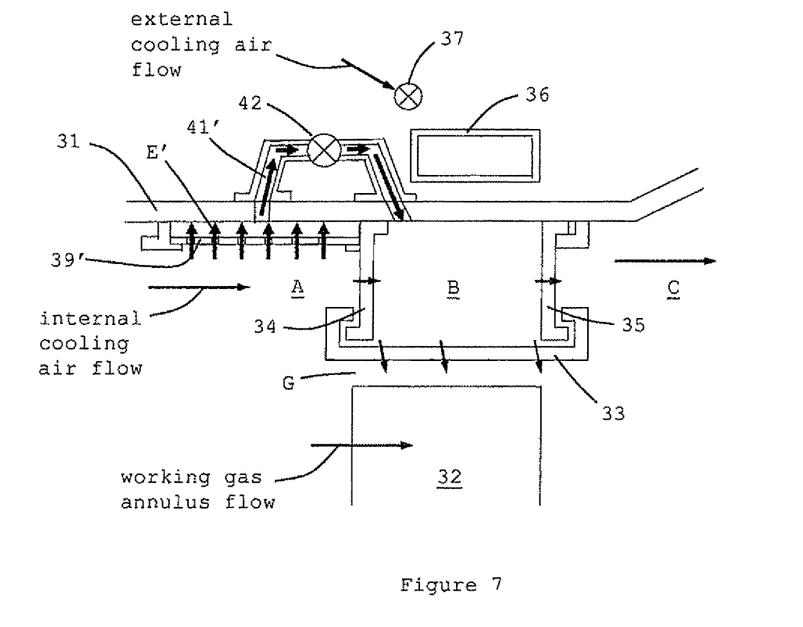
FIG. 7 shows the cross-section and the TCC arrangement of FIG. 6 in an operating mode when internal heat transfer is enhanced.
Figure 8:
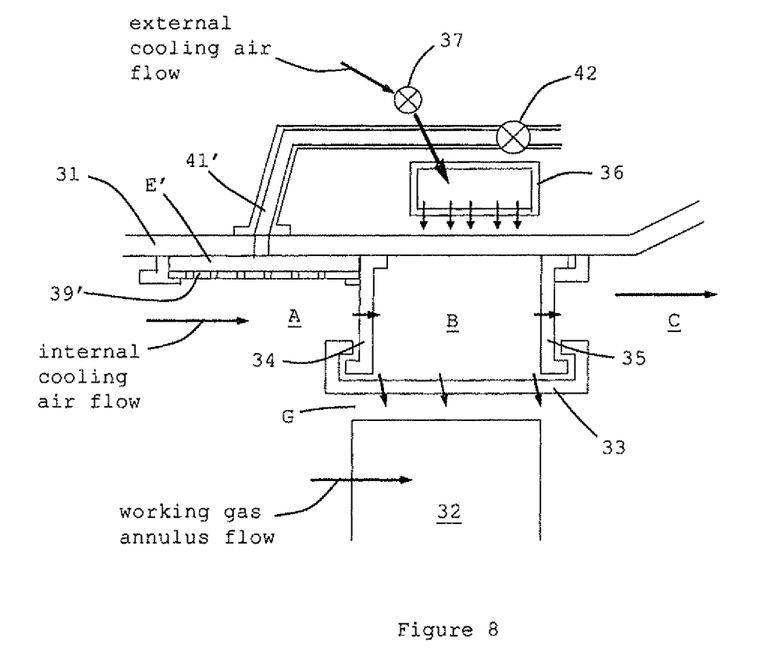
FIG. 8 is a schematic longitudinal cross-section through an engine at a turbine rotor stage and shows a TCC arrangement according to a third embodiment of the present invention in an operating mode when internal heat transfer is suppressed.
Figure 9:
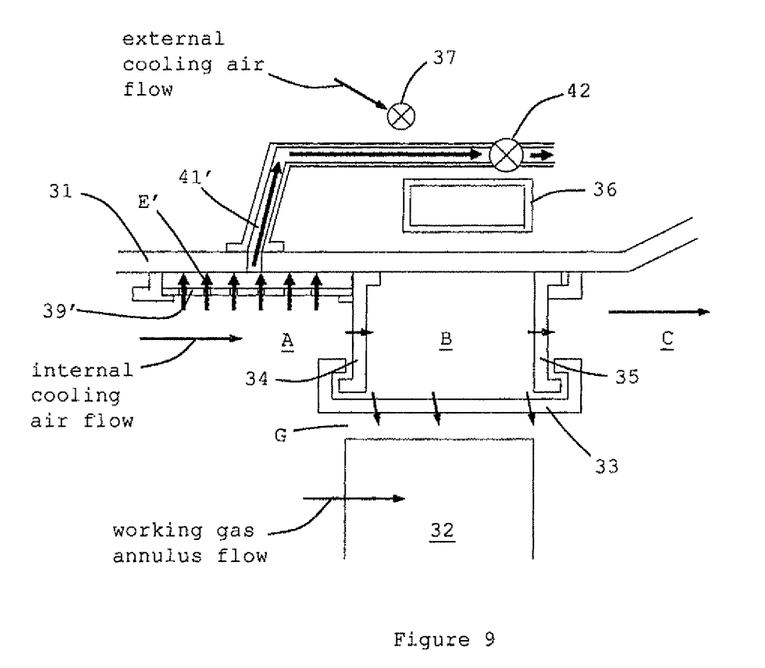
FIG. 9 shows the cross-section and the TCC arrangement of FIG. 8 in an operating mode when internal heat transfer is enhanced.
Figure 10:
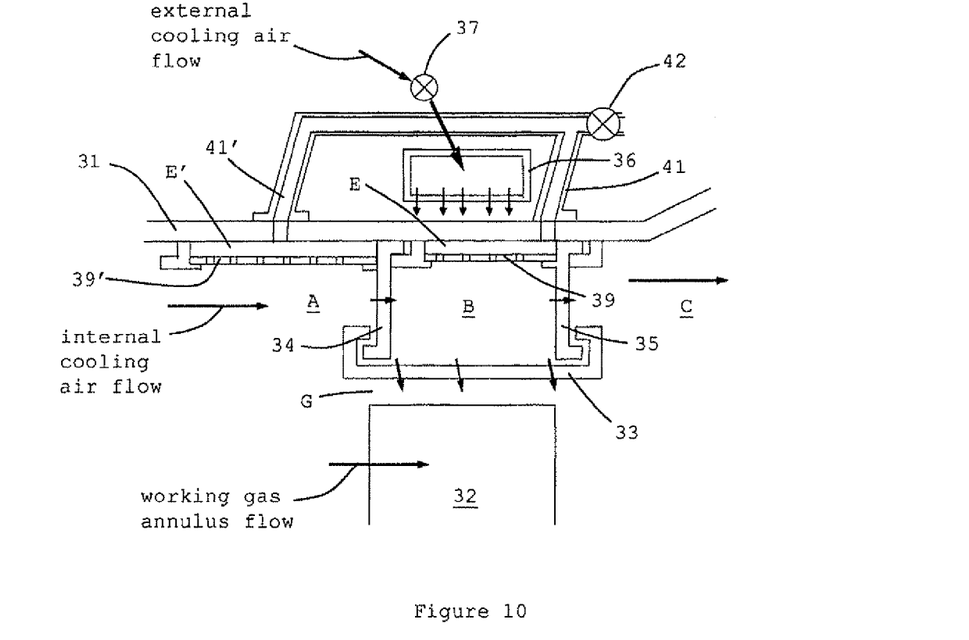
FIG. 10 is a schematic longitudinal cross-section through an engine at a turbine rotor stage and shows a TCC arrangement according to a fourth embodiment of the present invention in an operating mode when internal heat transfer is suppressed.
Figure 11:
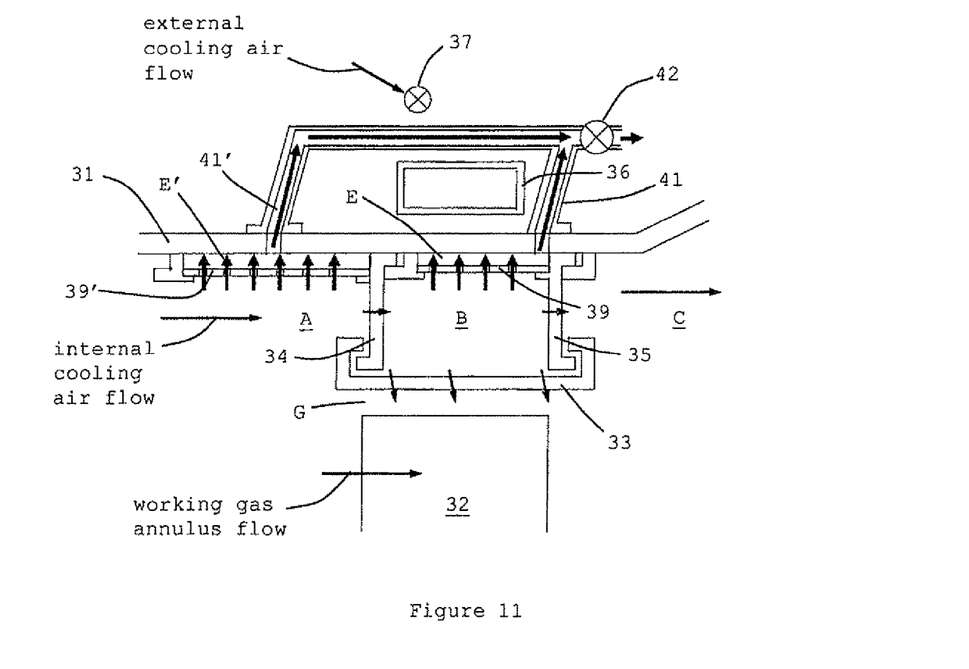
FIG. 11 shows the cross-section and the TCC arrangement of FIG. 10 in an operating mode when internal heat transfer is enhanced.
Figure 12:
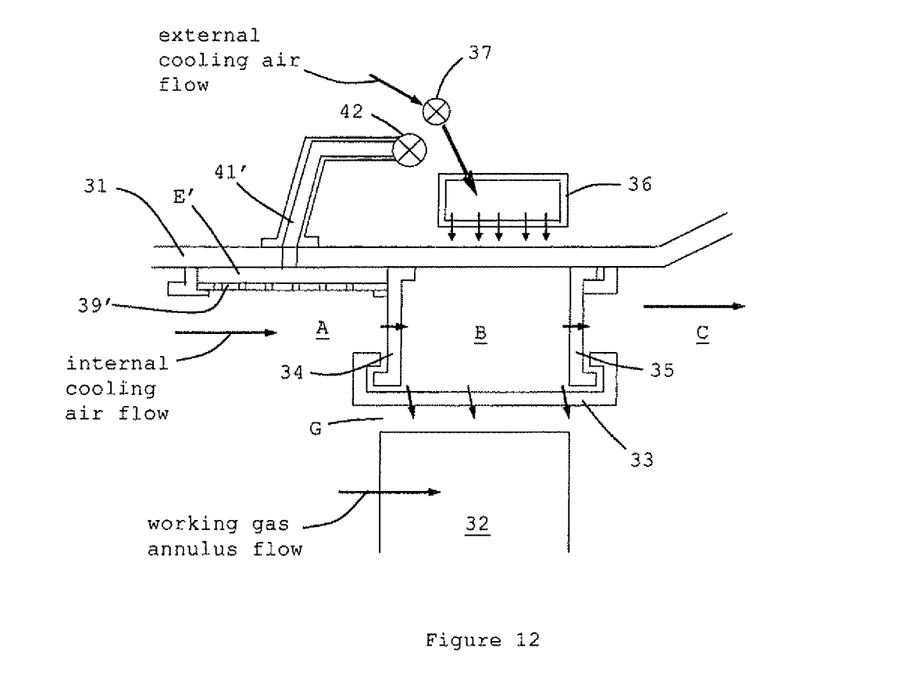
FIG. 12 is a schematic longitudinal cross-section through an engine at a turbine rotor stage and shows a TCC arrangement according to a fifth embodiment of the present invention in an operating mode when internal heat transfer is suppressed.
Figure 13:
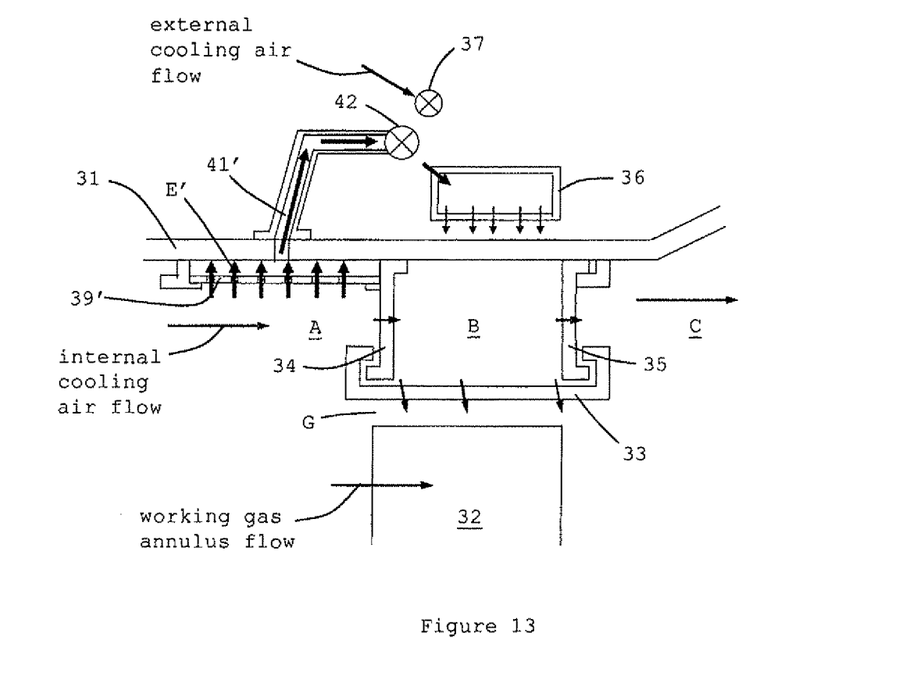
FIG. 13 shows the cross-section and the TCC arrangement of FIG. 12 in an operating mode when internal heat transfer is enhanced.
Figure 14:
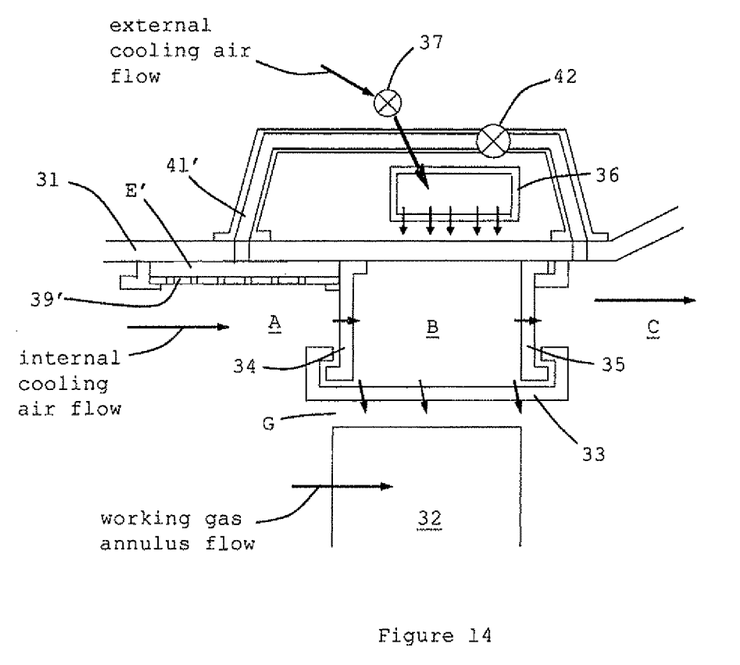
FIG. 14 is a schematic longitudinal cross-section through an engine at a turbine rotor stage and shows a TCC arrangement according to a sixth embodiment of the present invention in an operating mode when internal heat transfer is suppressed.
Figure 15:
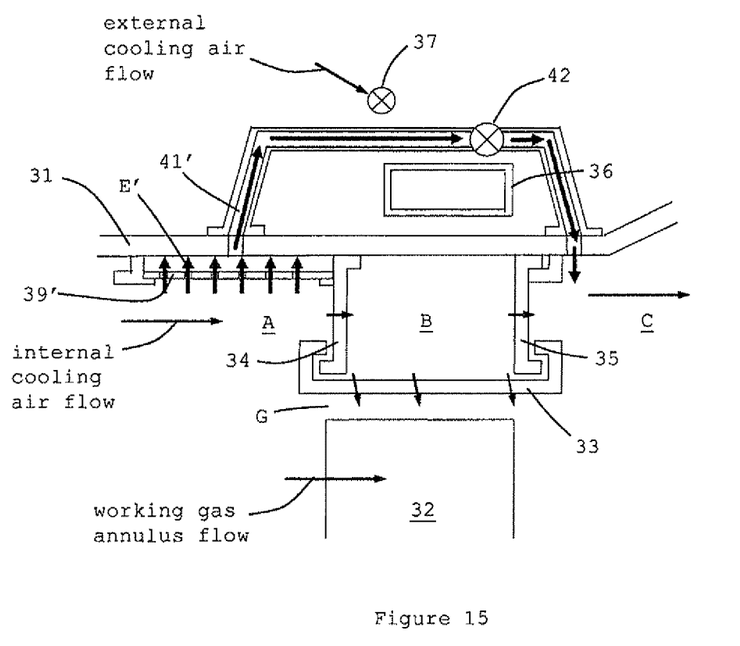
FIG. 15 shows the cross-section and the TCC arrangement of FIG. 14 in an operating mode when internal heat transfer is enhanced.

FIGS. 6 to 15 show TCC arrangements according further embodiments of the present invention. FIGS. 6 and 7 show a second embodiment in operating modes in which internal heat transfer is respectively suppressed and enhanced. FIGS. 8 and 9 show a third embodiment in operating modes in which internal heat transfer is respectively suppressed and enhanced. FIGS. 10 and 11 show a fourth embodiment in operating modes in which internal heat transfer is respectively suppressed and enhanced. FIGS. 12 and 13 show a fifth embodiment in operating modes in which internal heat transfer is respectively suppressed and enhanced. FIGS. 14 and 15 show a sixth embodiment in operating modes in which internal heat transfer is respectively suppressed and enhanced. Again in all of FIGS. 6 to 15, features corresponding to features of FIGS. 2 and 3 have the same reference numbers as in FIGS. 2 and 3.

In the second embodiment of FIGS. 6 and 7, a wall 39' extends forward from the front segment carrier 34 to define a heating control chamber E' bounded by the wall and the inner surface of the casing 31. Like the dividing wall 39 of the first embodiment, the wall 39' contains an array of through-holes.

A duct 41' traversing the casing 31 allows the heating control chamber E' to fluidly communicate with cavity B, which spaces the seal segments 33 from the inner side of the casing. The 2-position off/on valve 42 opens of closes the duct.

The heating control chamber E' operates in a similar manner to the chamber E of the first embodiment. As shown in FIG. 6, when valve 42 is off, there is no exhaust route from heating control chamber E', and consequently little circulation of hot cooling air from cavity A to the heating control chamber via the through-holes in wall 39'. Internal heat transfer from the hot cooling air to the casing 31 is thus suppressed. In contrast, as shown in FIG. 7, with valve 42 on, hot cooling air flows through the through holes of wall 39'. The relatively small stand-off of wall 39' from the casing causes the in-flowing air to impinge as jets on the inner surface of the casing. The in-flowing air then exhausts from the heating control chamber via the duct 41' and is returned to spacing cavity B. Simultaneously with the opening of the duct, valve 37 can be switched off to prevent the impingement of cold cooling air from the ring manifold 36 onto the outer surface of the casing.

The second embodiment takes advantage of the pressure drop that can exist between cavities A and B to drive the flow of hot cooling air through the through-holes in wall 39'. Further, if the valve 42 were to malfunction and remain in the on position, the total flow of cooling air into cavity B would not be reduced.

The third embodiment of FIGS. 8 and 9 is similar to that of the second embodiment except that the duct 41' exhausts overboard, for example into a fan bypass duct, a ventilation zone around the casing, or rearwards into the ventilation zone exhaust slot.

The fourth embodiment of FIGS. 10 and 11 combines features of the first and the third embodiments, so that there are two heating control chambers E, E' (one formed from a radially outer part of the spacing cavity and the other forward of the from the front segment carrier 34) and two respective ducts 41, 41' exhausting the heating control chambers. Both ducts exhaust outboard. By providing two heating chambers, heat transfer to the casing can be further enhanced when the valve 42 (which controls both ducts) is open. Likewise, heat transfer to the casing can be further suppressed when the valve is closed.

The fifth embodiment of FIGS. 12 and 13 is similar to that of the second embodiment except that the duct 41' exhausts into the ring manifold 36. In this way, when the valve 42 is open, the hot cooling air exhausting from the heating chamber E' is recycled to impinge on the exterior of the casing 31 from the manifold and further enhance heat transfer to the casing.

The sixth embodiment of FIGS. 14 and 15 is similar to that of the second embodiment except that, similar to the first embodiment, the duct 41' exhausts the heating control chamber E to the interior of the casing downstream of the segment carriers 34, 35 at cavity C.

While the invention has been described in conjunction with the exemplary embodiments described above, many equivalent modifications and variations will be apparent to those skilled in the art when given this disclosure.

For example, a low-flow/high-flow valve or a fully modulating valve could be used in place of off/on valve 42. It may be possible to open the valve for relatively short periods (e.g.

tens of seconds) to manage the thermal transient during the take-off phase of flight, particularly in engines where there would be a benefit in speeding up the heating response of the casing to match the heating rate of the disk to which the rotor blades are attached. Similarly, it may be possible to open the valve during the initial idle and taxi-out phase of flight, particularly in engines where the idle plus taxi-out duration is insufficient to thermally stabilise the casing and there would be a tip rub reduction benefit in having the casing pre-heated prior to the onset of the centrifugal and thermal blade and growth during the take-off acceleration. It may be advantageous to open the valve 42 during the acceleration at the start of take-off, thereby reducing the peak closure of tip clearance which can occur early in the take-off phase in many engines. This would have the consequence of reducing the demand for casing contraction at other phases of flight, including cruise, which would therefore have the benefit of reducing further the level of external cooling flow required at these other phases. It may also be advantageous to open the valve 42 if, at any stage through a derated take-off or derated climb, an engine is accelerated towards its maximum rating. Configuring the valve to open in such an event would, in a similar manner to the treatment of the cruise to step climb acceleration, allow the clearance to be run at a tighter level during the derated operation than would otherwise be the case. It may be possible to pulse the valve to achieve a time-averaged level of internal heat transfer which is between the levels achieved when the valve is off and on.

Accordingly, the exemplary embodiments of the invention set forth above are considered to be illustrative and not limiting. Various changes to the described embodiments may be made without departing from the spirit and scope of the invention.

The invention claimed is:

1. A gas turbine engine having:
   a row of circumferentially spaced rotor blades, each having a radially outer tip,
   a plurality of seal segments circumscribing the rotor blade tips and attached to a radially inward side of a casing of the engine, the seal segments being spaced from the casing by a spacing cavity, whereby, in use, a flow of relatively hot cooling air is routed to the spacing cavity to provide cooling for the seal segments, and
   an external cooling arrangement for impinging relatively cold cooling air on a radially outward side of the casing and thereby controlling a radial clearance between the rotor blade tips and the seal segments;
   wherein the engine further has a wall containing a plurality of through-holes which is attached to a radially inward side of the casing adjacent the seal segments, the wall being spaced from the casing to define a heating control chamber between the wall and the casing, and the engine further has one or more closable ducts which allow air to be exhausted from the heating control chamber, whereby, when the ducts are open, a portion of the hot cooling air flows through the through-holes to impinge on the casing and then exhausts from the heating control chamber through the ducts.

2. A gas turbine engine according to claim 1, wherein the wall is a dividing wall which separates the spacing cavity into two radially spaced chambers, the radially inner sub-chamber receiving the flow of hot cooling air, and the radially outer sub-chamber being the heating control chamber.

3. A gas turbine engine according to claim 2, wherein the engine further has a second wall containing a plurality of through-holes which is attached to a radially inward side of the casing adjacent the seal segments, the second wall being spaced from the casing to define a second heating control chamber between the wall and the casing, the second wall and the second heating control chamber being located forward of the spacing cavity;
   wherein the engine further has one or more second closable ducts which allow air to be exhausted from the second heating control chamber, whereby, when the second ducts are open, a portion of the hot cooling air flows through the through-holes of the second wall to impinge on the casing and then exhausts from the second heating control chamber through the second ducts.

4. A gas turbine engine according to claim 1, wherein the wall and the heating control chamber are located forward of the spacing cavity.

5. A gas turbine engine according to claim 1, wherein the ducts exhaust the hot cooling air to the radially inward side of the casing.

6. A gas turbine engine according to claim 5, wherein
   the wall and the heating control chamber are located forward of the spacing cavity, and
   the ducts exhaust the hot cooling air into the spacing cavity.

7. A gas turbine engine according to claim 1, wherein the ducts exhaust the hot cooling air to the radially outward side of the casing.

8. A gas turbine engine according to claim 1, wherein the cooling arrangement is configured such that the amount of impinging cold cooling air can be controllably varied.

9. A gas turbine engine according to claim 1, wherein the cooling arrangement comprises a manifold circumscribing the casing, the manifold carrying the cold cooling air and having a plurality of further through-holes at a radially inner side thereof through which the cold cooling air flows to impinge on the casing.

10. A gas turbine engine according to claim 9, wherein
    the ducts exhaust the hot cooling air to the radially outward side of the casing, and
    the ducts exhaust the hot cooling air into the manifold.

11. A gas turbine engine according to claim 1, wherein the ducts open when the engine accelerates from a cruise operating condition.

12. A gas turbine engine according to claim 11, wherein
    the cooling arrangement is configured such that the amount of impinging cold cooling air can be controllably varied, and
    when the ducts are open, the impingement of cold cooling air on the casing from the cooling arrangement is reduced or prevented.

13. A method of operating the gas turbine engine of claim 1, the method comprising the steps of:
    (a) running the engine at a cruise operating condition with the ducts closed, and
    (b) accelerating the engine and opening the ducts so that hot cooling air flows through the through-holes to impinge on the casing.

14. A method according to claim 13, wherein, during step (a), cold cooling air from the external cooling arrangement impinges on the radially outward side of the casing.

15. A method according to claim 14, wherein, during step (b), the impingement of cold cooling air from the external cooling arrangement on the radially outward side of the casing is reduced or prevented.

16. A method according to claim 13, further comprising the steps, after step (b), of:
    (c) closing the ducts, and
    (d) running the engine at a second cruise operating condition.

17. A method according to claim 16, wherein,
during step (b), the impingement of cold cooling air from the external cooling arrangement on the radially outward side of the casing is reduced or prevented, and
after step (b), impingement of cold cooling air from the external cooling arrangement on the radially outward side of the casing is increased or recommenced.

\* \* \* \* \*